US009967827B2

(12) United States Patent
Rong et al.

(10) Patent No.: US 9,967,827 B2
(45) Date of Patent: May 8, 2018

(54) SYSTEM AND METHOD FOR POWER CONTROL

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days. days.

(21) Appl. No.: 14/868,031

(22) Filed: Sep. 28, 2015

(65) Prior Publication Data
US 2016/0100370 A1    Apr. 7, 2016

Related U.S. Application Data

(60) Provisional application No. 62/059,030, filed on Oct. 2, 2014.

(51) Int. Cl.
H04W 52/02 (2009.01)
H04W 52/06 (2009.01)
H04W 72/04 (2009.01)
H04W 52/14 (2009.01)
H04W 52/24 (2009.01)
(Continued)

(52) U.S. Cl.
CPC ........... *H04W 52/06* (2013.01); *H04W 52/10* (2013.01); *H04W 52/146* (2013.01); *H04W 52/247* (2013.01); *H04W 72/0473* (2013.01); *H04W 52/242* (2013.01); *H04W 52/54* (2013.01); *H04W 72/1289* (2013.01)

(58) Field of Classification Search
CPC ............ H04W 72/1289; H04W 52/06; H04W 72/0473; H04W 52/54; H04W 52/242; H04W 52/247; H04W 52/146

USPC ........................................................ 455/522
See application file for complete search history.

(56) References Cited

U.S. PATENT DOCUMENTS

2005/0208946 A1    9/2005  Kahana
2009/0052575 A1    2/2009  Waheed et al.
(Continued)

FOREIGN PATENT DOCUMENTS

JP    2014060817 A    4/2014
KR    20140018962 A    2/2014
(Continued)

OTHER PUBLICATIONS

Cariou, L., et al., "High-efficiency WLAN," IEEE 802.11-13/0331r5, Mar. 19, 2013, 21 pages.
Cariou, L., et al., "High-efficiency WLAN Straw poll," IEEE 802.11-13/0339r10, Mar. 19, 2013, 7 pages.
PCT Search Report and Written Opinion for PCT/CN2015/091224, dated Dec. 31, 2015. 12 pages.
(Continued)

Primary Examiner — Shaima Q Aminzay
(74) Attorney, Agent, or Firm — Futurewei Technologies, Inc.

(57) ABSTRACT

A method of communicating in a wireless system includes receiving resource scheduling information indicating a location of a resource for transmitting a packet, an indication of a target power level, and an indication of a first bandwidth, receiving an indication of a first transmission power level, determining a second transmission power level in accordance with the target power level, and at least one of the first bandwidth and the first transmission power level, and transmitting the packet at the location of the resource with the second transmission power level.

15 Claims, 7 Drawing Sheets

(51) Int. Cl.
  *H04W 52/10* (2009.01)
  *H04W 72/12* (2009.01)
  *H04W 52/54* (2009.01)

(56) References Cited

U.S. PATENT DOCUMENTS

| | | | |
|---|---|---|---|
| 2013/0295979 A1 | 11/2013 | Shin et al. | |
| 2015/0085732 A1 | 3/2015 | Bao et al. | |
| 2015/0319700 A1* | 11/2015 | Oteri | H04W 52/10 455/127.1 |
| 2015/0358925 A1 | 12/2015 | Nobukiyo et al. | |
| 2015/0373685 A1 | 12/2015 | Seok | |

FOREIGN PATENT DOCUMENTS

| | | |
|---|---|---|
| RU | 2443079 C2 | 2/2012 |
| WO | 2005008938 A2 | 1/2005 |
| WO | 2006110492 A2 | 10/2006 |
| WO | 2009/026739 A1 | 3/2009 |
| WO | 2009/120126 A1 | 10/2009 |
| WO | 2014/071308 A1 | 5/2014 |
| WO | 2014/119264 A1 | 8/2014 |
| WO | 2014123349 A1 | 8/2014 |

OTHER PUBLICATIONS

XP002734413, Erik Dahlman et al., "LTE transmission procedures", in: 3G evolution: HSPA and LTE for mobile broadband ,Chapter 19, dated Aug. 6, 2008, total 50 pages.

XP020925644, "3GPP TS 36.331 V12.3.0(Sep. 2014)", 3rd Generation Partnership Project; Technical Specification Group Radio Access Network; Evolved Universal Terrestrial Radio Access (E-UTRA); Radio Resource Control (RRC); Protocol specification (Release 12), dated Sep. 2014, total 378 pages.

XP050926112, "3GPP TS 36.213 V12.3.0(Sep. 2014)", 3rd Generation Partnership Project; Technical Specification Group Radio Access Network; Evolved Universal Terrestrial Radio Access (E-UTRA); Physical layer procedures (Release 12), dated Sep. 2014, total 212 pages.

XP050926113, "3GPP TS 36.214 V12.0.0 (Sep. 2014)", 3rd Generation Partnership Project; Technical Specification Group Radio Access Network; Evolved Universal Terrestrial Radio Access (E-UTRA); Physical layer; Measurements (Release 12), dated Sep. 2014, total 14 pages.

3GPP TS 36.212 V12.0.0 (Dec. 2013), 3rd Generation Partnership Project;Technical Specification Group Radio Access Network; Evolved Universal Terrestrial Radio Access (E-UTRA); Multiplexing and channel coding (Release 12), dated Dec. 2014, total 88 pages.

\* cited by examiner

SYSTEM AND METHOD FOR POWER CONTROL

This application claims the benefit of U.S. Provisional Application No. 62/059,030, filed on Oct. 2, 2014, entitled "System and Method for Power Control," which application is hereby incorporated herein by reference.

TECHNICAL FIELD

The present disclosure relates generally to digital communications, and more particularly to a system and method for power control.

BACKGROUND

As the number of smartphones/tablets with WiFi connection capability keeps growing, the density of access points (APs) and stations (STAs) is getting higher, especially in urban areas. The high density of APs and STAs makes WiFi system less efficient since the original WiFi system was designed assuming a low density of APs and STAs. For example, the current enhanced distributed channel access (EDCA-based) media access control (MAC) scheme will not work efficiently in an environment with a high density of APs and STAs. As a result, a new Study Group (SG) called High Efficiency Wireless Local Area Network (WLAN) (HEW) was formed in IEEE 802.11 to improve system performance in high density environments. As a result of the study of the HEW SG, a Task Group called TGax was formed in May 2014.

SUMMARY OF THE DISCLOSURE

Example embodiments provide a system and method for power control.

In accordance with an example embodiment, a method of communicating in a wireless system is provided. The method includes receiving, by a station, resource scheduling information indicating a location of a resource for transmitting a packet, an indication of a target power level, and an indication of a first bandwidth, receiving, by the station, an indication of a first transmission power level, determining, by the station, a second transmission power level in accordance with the target power level, and at least one of the first bandwidth and the first transmission power level, and transmitting, by the station, the packet at the location of the resource with the second transmission power level.

In accordance with another example embodiment, a method of communicating in a wireless system is provided. The method includes transmitting, by an access point, resource allocation information indicating a location of a resource for transmitting a packet, an indication of a target power level, and an indication of a first bandwidth, transmitting, by the access point, an indication of a first transmission power level, and receiving, by the access point, the packet at the location of the resource.

In accordance with another example embodiment, a station adapted to perform power control is provided. The station includes a receiver, a processor operatively coupled to the receiver, and a transmitter operatively coupled to the processor. The receiver receives resource scheduling information indicating a location of a resource for transmitting a packet, an indication of a target power level, and an indication of a first bandwidth, and receives an indication of a first transmission power level. The processor determines a second transmission power level in accordance with the target power level, and at least one of the first bandwidth and the first transmission power level. The transmitter transmits the packet at the location of the resource with the second transmission power level.

In accordance with another example embodiment, an access point is provided. The access point includes a transmitter, and a receiver operatively coupled to the transmitter. The transmitter transmits resource allocation information indicating a location of a resource for transmitting a packet, an indication of a target power level, and an indication of a first bandwidth, and transmits an indication of a first transmission power level. The receiver receives the packet at the location of the resource.

Practice of the foregoing embodiments enable transmission power control in an asynchronous communications system with potentially dynamic system bandwidth.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to power control. For example, a station receives resource scheduling information indicating a location of a resource for transmitting a packet, an indication of a target power level, and an indication of a first bandwidth, receives an indication of a first transmission power level, determines a second transmission power level in accordance with the target power level, and at least one of the first bandwidth and the first transmission power level, and transmits the packet at the location of the resource with the second transmission power level.

The embodiments will be described with respect to example embodiments in a specific context, namely communications systems that are asynchronous with potentially dynamic system bandwidth but uses power control to improve communications performance. The embodiments may be applied to standards compliant communications systems, such as those that are compliant with IEEE 802.11, and the like, technical standards, and non-standards compliant communications systems, that are asynchronous with potentially dynamic system bandwidth but uses power control to improve communications performance.

Figure 1:
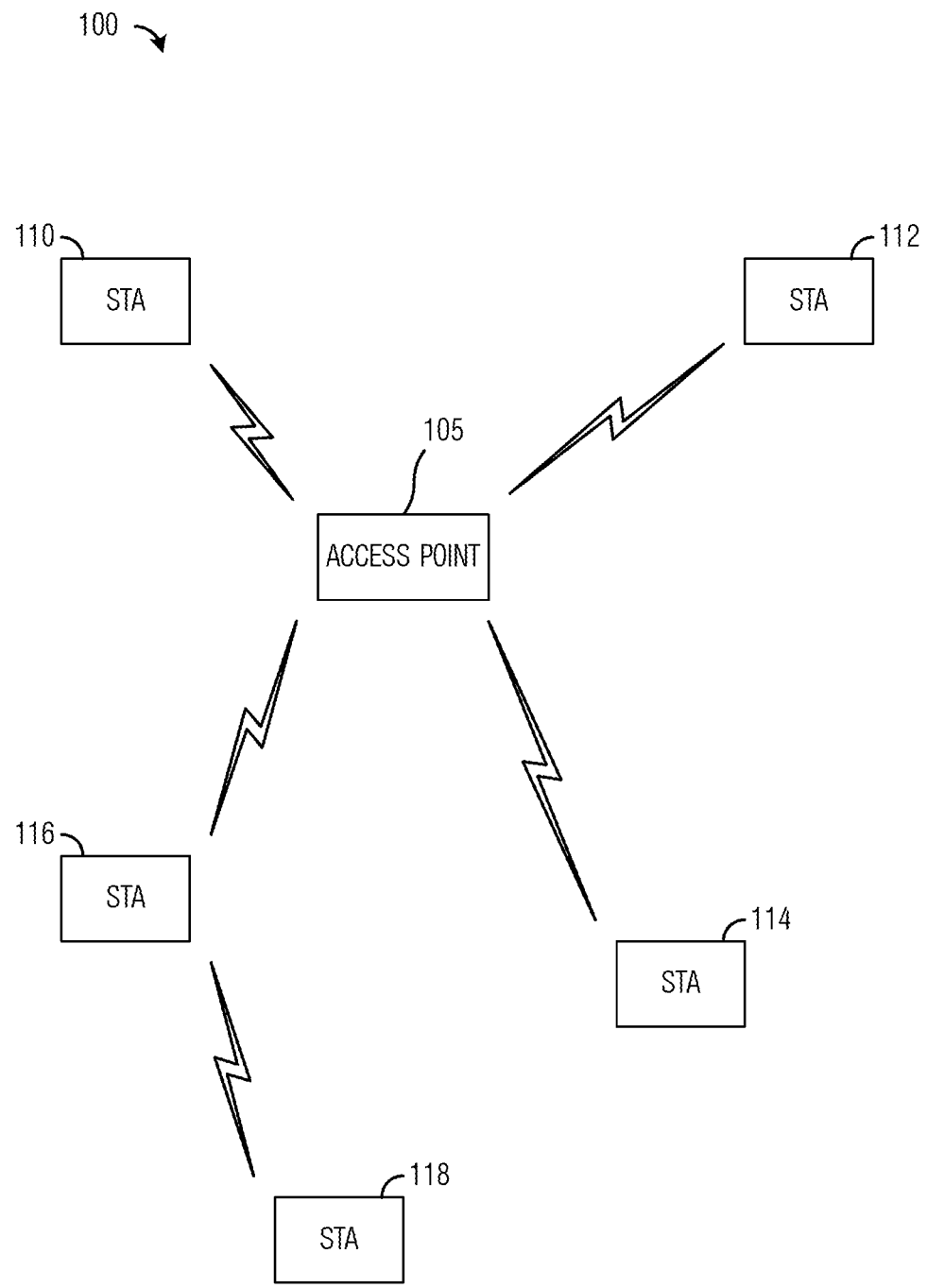
FIG. 1 illustrates an example wireless communications system according to example embodiments described herein.

FIG. 1 illustrates an example wireless communications system 100. Wireless communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
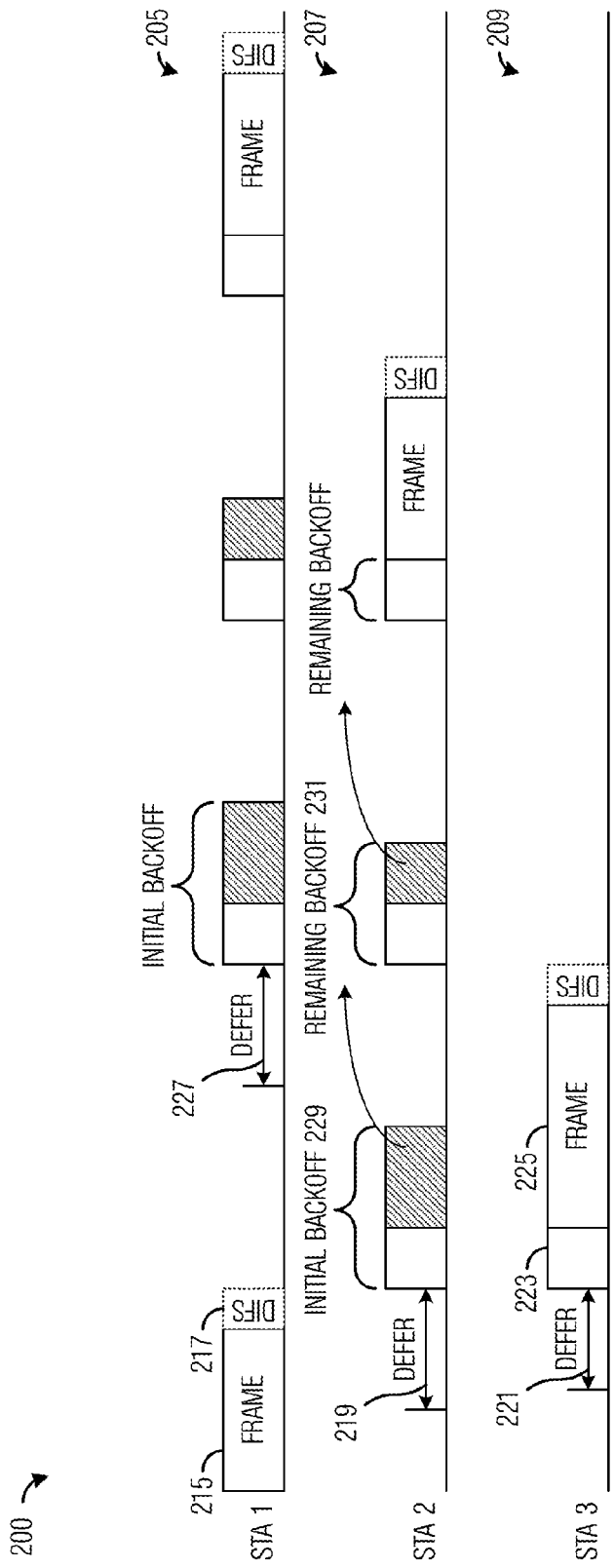
FIG. 2 illustrates a diagram of example channel access timing according to example embodiments described herein.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). A short inter-frame space (SIFS) has a duration of 16 microseconds, a point coordination function (PCF) inter-frame space (PIFS) has a duration of 25 microseconds, while a distributed inter-frame space (DIFS) may last longer than either the SIFS or the PIFS. A backoff period may be a random duration. Therefore, active scanning may not provide the best solution when there are large numbers of stations attempting to perform AP/network discovery.

In cellular communications systems, e.g., 3GPP LTE compliant communications systems, orthogonal frequency division multiple access (OFDMA) has been shown to be able to provide robust performance in high density environments. OFDMA has the ability to support multiple users simultaneously by carrying traffic from different users on different portions of the communications system bandwidth. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multi-user multiple input multiple output (UL MU-MIMO) techniques have also been used in cellular communications systems, e.g., 3GPP LTE, to enhance communications system performance. UL MU-MIMO allows multiple users to simultaneously transmit on the same time-frequency resource(s) with the transmissions being separated in space (i.e., on different spatial streams).

To support OFDMA and UL MU-MIMO, the power of the received signal from multiple stations at the AP receiver should be at an appropriate level, as shown in the following examples. For UL MU-MIMO, the power difference of the received signal from multiple stations on the same time-frequency resource should be within a reasonable range. Otherwise, if the difference is too large, the interference from the stronger received signal will overwhelm the weaker one, making UL MU-MIMO not workable. For OFDMA, due to implementation inaccuracies, there exists interference leaked from one resource unit to another, especially for those adjacent to each other. Therefore it is also important to maintain the power difference of the received signal from multiple stations to be within a reasonable range to avoid the weaker one being overwhelmed by the stronger one.

UL transmission power control can be utilized to make sure that the power of the received signal from multiple STAs at the AP receiver is at appropriate level. UL power control is also helpful to control the interference among the overlapping basic service set (OBSS).

In LTE, UL transmission power control includes both closed loop and open loop power control. In closed loop power control, the enhanced Node B (eNB) sends a power control command to instruct the UE to increase or decrease its UL transmission power. In open loop power control, the UE measures path loss (PL) between the eNB and itself based on the downlink (DL) reference signal (RS) measurement, and adjusts its UL transmission power according to the measured PL and other factors such as the size of the allocated UL resource and modulation coding scheme (MCS), etc.

However, in Wi-Fi system such as 11ax, the aforementioned UL power control schemes may not work. Wi-Fi system is asynchronous, there is no a periodic UL control channel to enable the AP to perform UL received signal measurement and generate closed loop power control command accordingly. In LTE, where the system bandwidth and the DL RS power are usually fixed, PL measurement is straightforward, done by comparing the transmitted and received signal power of the DL RS. In a Wi-Fi system, the system bandwidth could be dynamic, e.g., varying from 20 MHz to 80 MHz. And since a station may not be required to monitor the whole system bandwidth, it is not straightforward to measure the PL.

According to an example embodiment, a frame transmitted by an AP to a station includes a resource allocation and an indication of downlink transmissions. The resource allocation includes information indicating resources (e.g., frequency resource allocations) for an uplink transmission allocated to the station as well as a target uplink receive power. The indication of the downlink transmissions may include an indication of a downlink transmission power level for a transmission made by the AP, as well as an indication of a total downlink bandwidth.

Figures 3A, 3B:
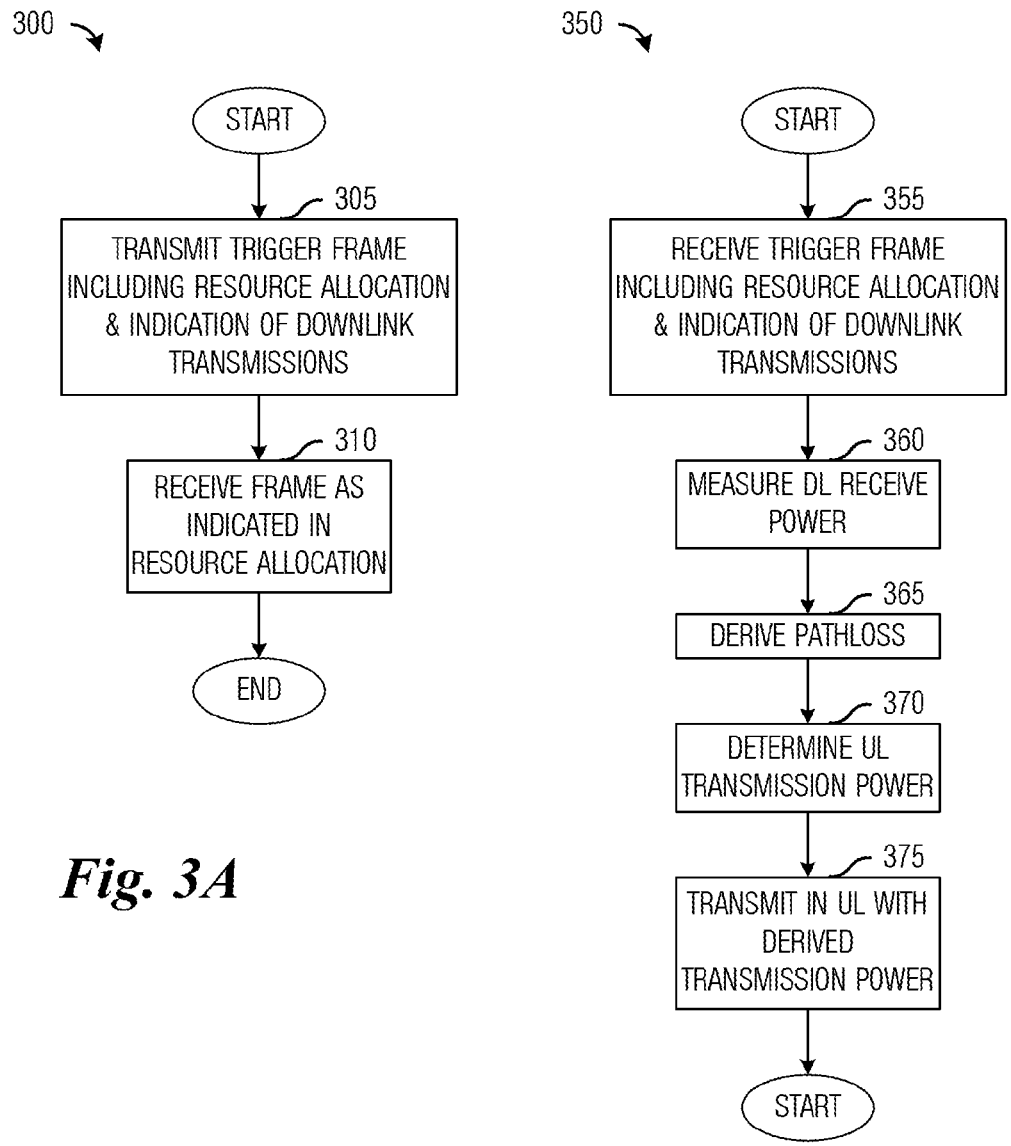
FIG. 3A illustrates a flow diagram of operations occurring in a first example embodiment of power control by an AP according to example embodiments described herein.
FIG. 3B illustrates a flow diagram of operations occurring in a first example embodiment of power control by a station according to example embodiments described herein.

FIG. 3A illustrates a flow diagram of operations 300 occurring in a first example embodiment of power control by an AP. Operations 300 may be indicative of operations occurring in an AP as the AP participates in power control in accordance with the first example embodiment.

Operations 300 begin with the AP transmitting a frame, such as a trigger frame, including a resource allocation and an indication of downlink transmissions (block 305). The resource allocation includes uplink scheduling information, such as an indication of resources (e.g., one or more frequency resource locations) for an uplink transmission allocated to the station. The uplink scheduling information also includes an indication of a target uplink received power, $P_{UL\_RX\_TARGET}$, for the station. The indication of downlink transmissions may include an indication of a downlink transmission power level of the downlink transmission including the frame, $P_{DL\_TX\_TOTAL}$, as well as an indication of total downlink bandwidth of the downlink transmission including the frame, $BW_{DL\_TOTAL}$. It is noted that the downlink transmission may include more bandwidth than the bandwidth occupied by the frame. As an example, the frame may be transmitted in 20 MHz of bandwidth while the total downlink bandwidth is 80 MHz. The remaining 60 MHz of bandwidth may be used for carrying other downlink frames. The AP receives a frame as indicated in the resource allocation of the trigger frame (block 310).

FIG. 3B illustrates a flow diagram of operations 350 occurring in a first example embodiment of power control by a station. Operations 350 may be indicative of operations occurring in a station as the station participates in power control in accordance with the first example embodiment.

Operations 350 begin with the station receiving a frame, such as a trigger frame, including a resource allocation and an indication of downlink transmissions (block 355). The resource allocation includes uplink scheduling information, such as an indication of resources (e.g., one or more frequency resource locations) for an uplink transmission allocated to the station. The uplink scheduling information also includes an indication of a target uplink receive power, $P_{UL\_RX\_TARGET}$, for the station. The indication of downlink transmissions may include an indication of a downlink transmission power level of the downlink transmission including the frame, $P_{DL\_TX\_TOTAL}$, as well as an indication of total downlink bandwidth of the downlink transmission including the frame, $BW_{DL\_TOTAL}$. It is noted that the downlink transmission may include more bandwidth than the bandwidth occupied by the frame. As an example, the frame may be transmitted in 20 MHz of bandwidth while the total downlink bandwidth is 80 MHz. The remaining 60 MHz of bandwidth may be used for carrying other downlink frames.

The station measures a downlink receive power of the frame, $P_{DL\_RX}$ (block 360). The downlink received power is measured only in the bandwidth occupied by the frame. The station derives a path loss between the AP and the station in accordance with the downlink receive power $P_{DL\_RX}$ (block 365). The path loss may be a difference between the downlink transmission power and the downlink receive power. As an illustrative example, the path loss may be expressed as $$\text{path loss} = P_{DL\_TX\_TOTAL} + 10 * \log_{10}(BW_{DL}/BW_{DL\_TOTAL}) - P_{DL\_RX},$$

where $BW_{DL}$ is the bandwidth of the frame, and $10*\log_{10}(BW_{DL}/BW_{DL\_TOTAL})$ is a scaling factor used when the power density in the downlink transmission is constant over the entire downlink bandwidth.

The station determines the uplink transmission power, $P_{UL\_TX}$, in accordance with the path loss and a maximum uplink transmission power of the station, $P_{UL\_TX\_MAX}$ (block 370). As an illustrative example, the uplink transmission power may be expressed as $$P_{UL\_TX} = \min(P_{UL\_TX\_MAX}, P_{UL\_RX\_TARGET} + \text{path loss}),$$

where min( ) is a minimum function that returns the minimum value of its input elements. The station transmits in the uplink in accordance with the uplink scheduling information at an uplink transmit power equal to $P_{UL\_TX}$ (block 375). The transmission in the uplink may occur in a short interframe space (SIFS) after the end of the downlink frame.

Figure 4:
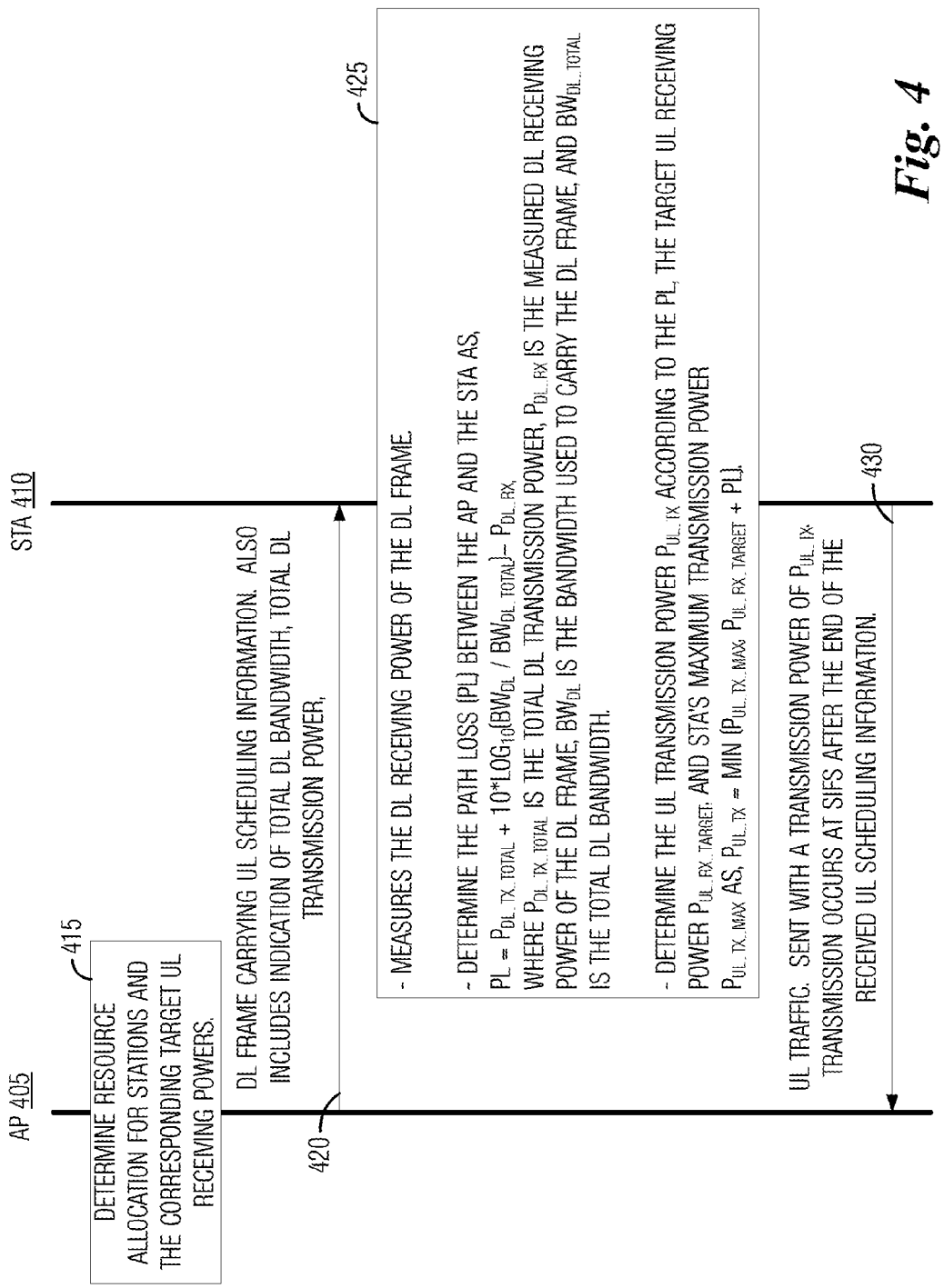
FIG. 4 illustrates a message exchange diagram between an AP and a station as the two devices participate in power control in accordance with the first example embodiment.

FIG. 4 illustrates a message exchange diagram between an AP 405 and a station 410 as the two devices participate in power control in accordance with the first example embodiment. AP 405 determines uplink resource allocations for stations, as well as corresponding target uplink receive powers (block 415). AP 405 transmits a frame in the downlink, the frame carrying uplink scheduling information, as well as an indication of downlink transmissions (event 420). Station 410 receives the frame and measures the downlink receive power of the frame, derives the path loss, and determines the uplink transmission power (block 425). Station 410 transmits in the uplink in accordance with the uplink scheduling information at an uplink transmit power (event 430).

As an illustrative example, consider a situation where a station receives a frame from an AP. For discussion purposes, assume that the station measures the downlink receive power of the frame $P_{DL\_RX}$ to be −60 dBm, the frame is carried in 20 MHz of bandwidth and includes uplink scheduling information, and the maximum uplink transmission power of the station is 15 dBm. The frame also includes an indication that the total downlink bandwidth is 80 MHz, an indication that the downlink transmission power is 23 dBm, and the target uplink receive power is −67 dBm. The station may determine the path loss to be $$\text{path loss} = P_{DL\_TX\_TOTAL} + 10 * \log_{10}(BW_{DL}/BW_{DL\_TOTAL}) - P_{DL\_RX},$$

$$\text{path loss} = 23 \text{ dBm} + 10 * \log_{10}(20 \text{ MHz}/80 \text{ MHz}) - (-60 \text{ dBm}),$$

$$\text{path loss} = 77 \text{ dB}.$$

The station may then derive the uplink transmission power to be $$P_{UL\_TX} = \min(P_{UL\_TX\_MAX}, P_{UL\_RX\_TARGET} + \text{path loss}),$$

$$P_{UL\_TX} = \min(15 \text{ dBm}, -67 \text{ dBm} + 77 \text{ dB}),$$

$$P_{UL\_TX} = 10 \text{ dBm}.$$

Therefore, in SIFS after the end of the frame, the station may start a transmission in the uplink with an uplink transmit power of 10 dBm on one or more resources indicated in the uplink scheduling information.

According to an example embodiment, in a situation where the total downlink transmission power is not evenly distributed across the total downlink bandwidth, the frame includes the downlink transmission power for only the bandwidth used to transmit the frame and not the downlink transmission power for the entire bandwidth.

Figures 5A, 5B:
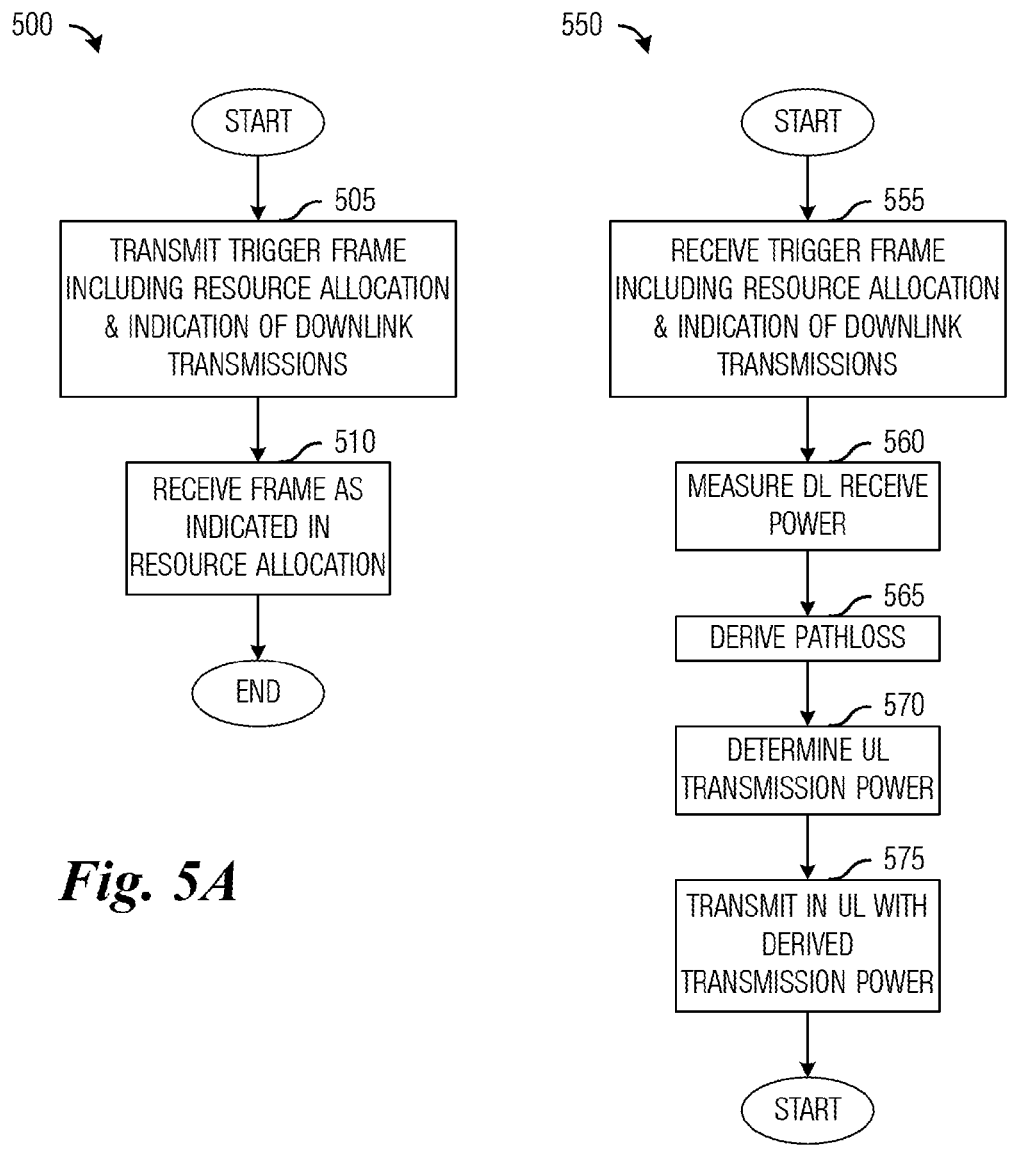
FIG. 5A illustrates a flow diagram of operations occurring in a second example embodiment of power control by an AP according to example embodiments described herein.
FIG. 5B illustrates a flow diagram of operations occurring in a second example embodiment of power control by a station according to example embodiments described herein.

FIG. 5A illustrates a flow diagram of operations 500 occurring in a second example embodiment of power control by an AP. Operations 500 may be indicative of operations occurring in an AP as the AP participates in power control in accordance with the second example embodiment.

Operations 500 begin with the AP transmitting a frame, such as a trigger frame, including a resource allocation and an indication of downlink transmissions (block 505). The resource allocation includes uplink scheduling information, such as an indication of resources (e.g., one or more frequency resource locations) for an uplink transmission allocated to the station. The uplink scheduling information also includes an indication of a target uplink received power, $P_{UL\_RX\_TARGET}$, for the station. The indication of downlink transmissions may include an indication of a downlink transmission power level of the frame, $P_{DL\_TX}$. It is noted that the downlink transmission may include more bandwidth than the bandwidth occupied by the frame. As an example, the frame may be transmitted in 20 MHz of bandwidth while the total downlink bandwidth is 80 MHz. The remaining 60 MHz of bandwidth may be used for carrying other downlink frames. Unlike in the first example embodiment, the power density in the downlink transmission is not constant. Hence, the AP indicates the transmit power level of the frame. The AP receives a frame as indicated in the resource allocation of the trigger frame (block 510).

FIG. 5B illustrates a flow diagram of operations 550 occurring in a second example embodiment of power control by a station. Operations 550 may be indicative of operations occurring in a station as the station participates in power control in accordance with the second example embodiment.

Operations 550 begin with the station receiving a frame, such as a trigger frame, including a resource allocation and an indication of downlink transmissions (block 555). The resource allocation includes uplink scheduling information, such as an indication of resources (e.g., one or more frequency resource locations) for an uplink transmission allocated to the station. The uplink scheduling information also includes an indication of a target uplink receive power, $P_{UL\_RX\_TARGET}$, for the station. The frame also includes an indication of downlink transmissions. The indication of downlink transmissions may include an indication of a downlink transmission power level of the frame, $P_{DL\_TX}$.

The station measures a downlink receive power of the frame, $P_{DL\_RX}$ (block 560). The downlink received power is measured only in the bandwidth occupied by the frame. The station derives a path loss between the AP and the station in accordance with the downlink receive power $P_{DL\_RX}$ (block 565). The path loss may be a difference between the downlink transmission power and the downlink receive power. As an illustrative example, the path loss may be expressed as $$\text{path loss} = P_{DL\_TX} - P_{DL\_RX}.$$

Since the power density of the downlink transmission is not constant, the power level for the frame may be different from the power levels of other portions of the downlink transmission.

The station determines the uplink transmission power, $P_{UL\_TX}$, in accordance with the path loss and a maximum uplink transmission power of the station, $P_{UL\_TX\_MAX}$ (block 570). As an illustrative example, the uplink transmission power may be expressed as $$P_{UL\_TX} = \min(P_{UL\_TX\_MAX}, P_{UL\_RX\_TARGET} + \text{path loss}),$$

where min( ) is a minimum function that returns the minimum value of its input elements. The station transmits in the uplink in accordance with the uplink scheduling information at an uplink transmit power equal to $P_{UL\_TX}$ (block 575). The transmission in the uplink may occur in a SIFS after the end of the downlink frame.

According to an example embodiment, a frame transmitted by an AP to a station includes a resource allocation but does not include an indication of the downlink transmission power or the downlink transmission power for the bandwidth used to transmit the frame, which is transmitted in a different frame. In situations where the downlink transmission power or the downlink transmission power for the bandwidth used to transmit the frame remains relatively constant for an extended amount of time, the communications overhead may be reduced by eliminating the indication of the total downlink transmission power or the downlink transmission power for the bandwidth used to transmit the frame. The indication of the total downlink transmission power or the downlink transmission power for the bandwidth used to transmit the frame may be carried in a system information frame, such as a beacon frame. The resource allocation (including information indicating resources (e.g., frequency resource allocations) for an uplink transmission allocated to the station as well as a target uplink receive power) is transmitted in another frame, such as a trigger frame.

Figures 6A, 6B:
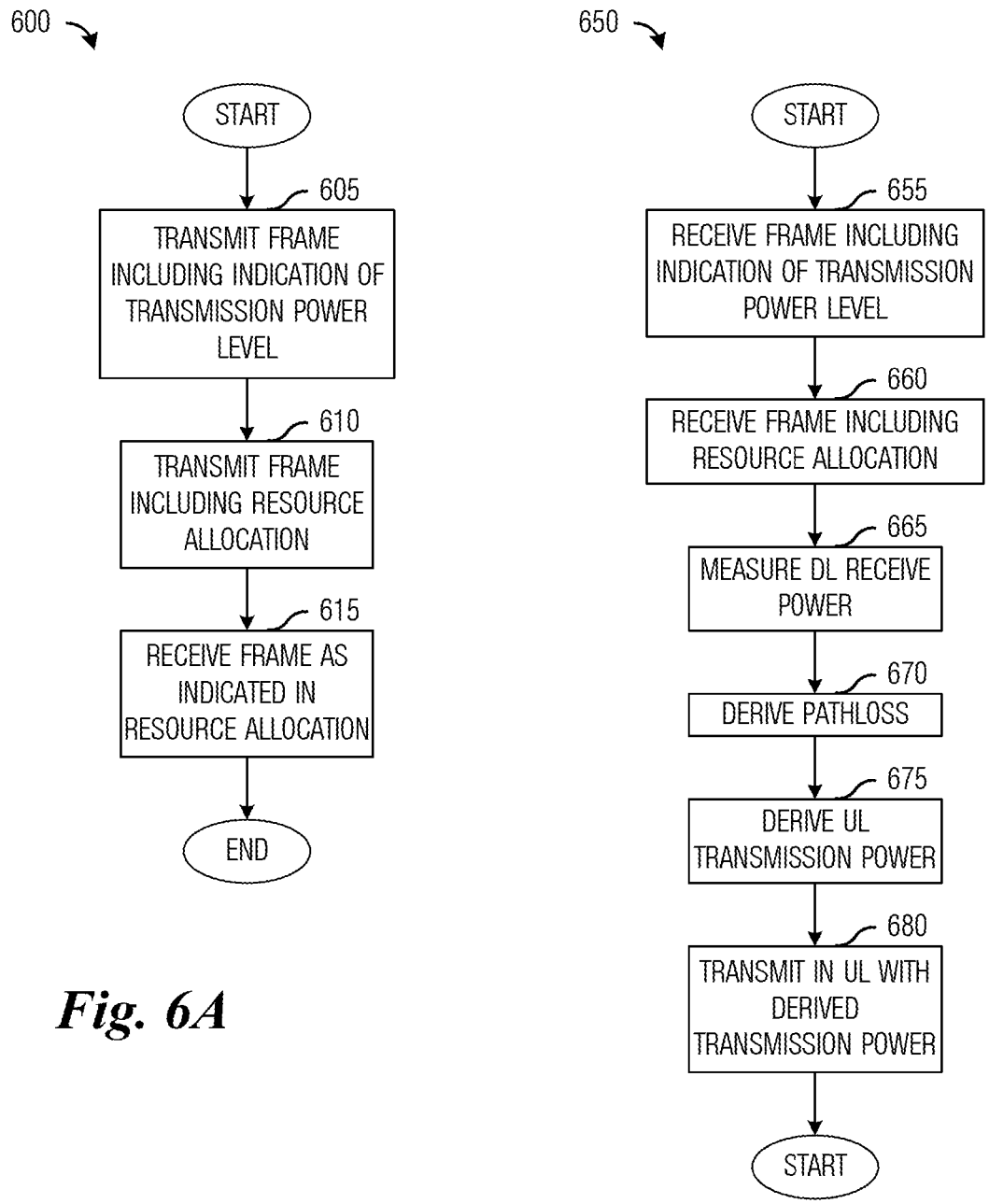
FIG. 6A illustrates a flow diagram of operations occurring in a third example embodiment of power control by an AP according to example embodiments described herein.
FIG. 6B illustrates a flow diagram of operations occurring in a third example embodiment of power control by a station according to example embodiments described herein.

FIG. 6A illustrates a flow diagram of operations 600 occurring in a third example embodiment of power control by an AP. Operations 600 may be indicative of operations occurring in an AP as the AP participates in power control in accordance with the third example embodiment.

Operations 600 begin with the AP transmitting a first frame, such as a system information frame, including an indication of downlink transmission power level (block 605). The downlink transmission power level may be for the entire downlink transmission (such as when the power density of the entire downlink transmission is constant) or the bandwidth used to transmit the first frame (such as when the power density of the downlink transmission is not constant over the bandwidth). The AP transmits a second frame, such as a trigger frame, including a resource allocation and an indication of downlink transmissions (block 610). The resource allocation includes uplink scheduling information, such as an indication of resources (e.g., one or more frequency resource locations) for an uplink transmission allocated to the station. The uplink scheduling information also includes an indication of a target uplink received power, $P_{UL\_RX\_TARGET}$, for the station. The indication of downlink transmissions may include an indication of a total downlink bandwidth, $BW_{DL\_TOTAL}$. The AP receives a frame as indicated in the resource allocation of the trigger frame (block 615).

FIG. 6B illustrates a flow diagram of operations 650 occurring in a third example embodiment of power control by a station. Operations 650 may be indicative of operations occurring in a station as the station participates in power control in accordance with the third example embodiment.

Operations 650 begin with the station receiving a first frame, such as a system information frame, including an indication of downlink transmission power level (block 655). Since the downlink transmission power level remains relatively constant, it may not be necessary to include it in each downlink transmission, thereby reducing communications overhead. The station receives a second frame, such as a trigger frame, including a resource allocation and an indication of downlink transmissions (block 660). The resource allocation includes uplink scheduling information, such as an indication of resources (e.g., one or more frequency resource locations) for an uplink transmission allocated to the station. The uplink scheduling information also includes an indication of a target uplink receive power, $P_{UL\_RX\_TARGET}$, for the station. The frame also includes an indication of downlink transmissions. The indication of downlink transmissions may include an indication of total downlink bandwidth of the downlink transmission including the frame, $BW_{DL\_TOTAL}$.

The station measures a downlink receive power of the frame, $P_{DL\_RX}$ (block 665). The downlink received power is measured only in the bandwidth occupied by the frame. The station derives a path loss between the AP and the station in accordance with the downlink receive power $P_{DL\_RX}$ (block 670). The path loss may be a difference between the downlink transmission power and the downlink receive power. As an illustrative example, the path loss may be expressed as $$\text{path loss} = P_{DL\_TX\_TOTAL} + 10*\log_{10}(BW_{DL}/BW_{DL\_TOTAL}) - P_{DL\_RX},$$

where $BW_{DL}$ is the bandwidth of the frame, and $10*\log_{10}(BW_{DL}/BW_{DL\_TOTAL})$ is a scaling factor used when the power density in the downlink transmission is constant over the entire downlink bandwidth.

The station determines the uplink transmission power, $P_{UL\_TX}$, in accordance with the path loss and a maximum uplink transmission power of the station, $P_{UL\_TX\_MAX}$ (block 675). As an illustrative example, the uplink transmission power may be expressed as $$P_{UL\_TX} = \min(P_{UL\_TX\_MAX}, P_{UL\_RX\_TARGET} + \text{path loss}),$$

where min( ) is a minimum function that returns the minimum value of its input elements. The station transmits in the uplink in accordance with the uplink scheduling information at an uplink transmit power equal to $P_{UL\_TX}$ (block 680). The transmission in the uplink may occur in a SIFS after the end of the downlink frame.

According to an example embodiment, it is possible to combine two or more of the example power control techniques presented herein. As an illustrative example, in a situation wherein the total downlink bandwidth of the downlink transmission including the frame is not constant but remains relatively unchanged over time, it is possible to include an indication of the total downlink bandwidth of the downlink transmission including the frame in a system information frame (a combination of the second example power control technique and the third example power control technique).

Figure 7:
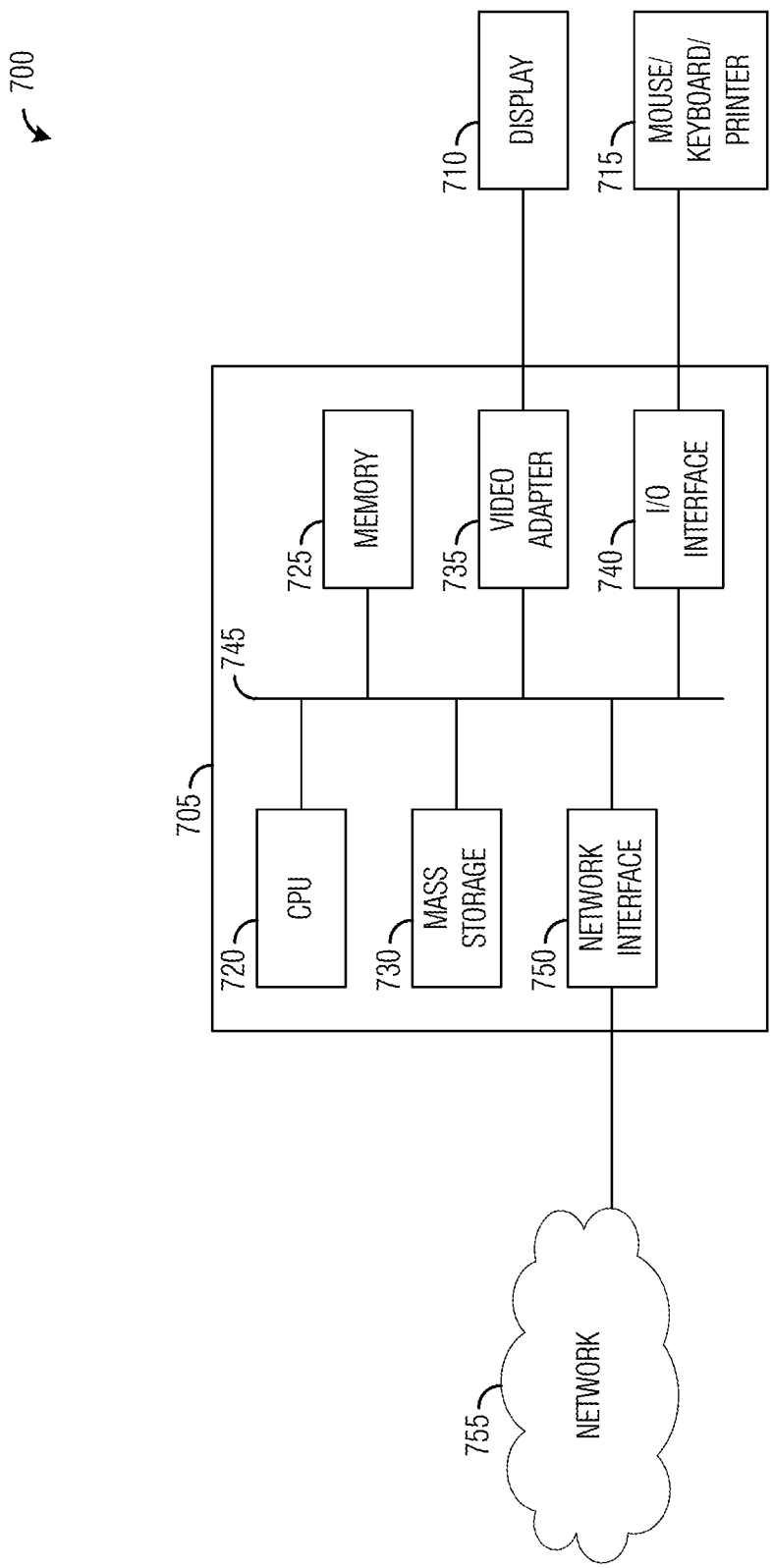
FIG. 7 is a block diagram of a processing system that may be used for implementing the devices and methods disclosed herein.

FIG. 7 is a block diagram of a processing system 700 that may be used for implementing the devices and methods disclosed herein. In some embodiments, the processing system 700 comprises a UE. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 705 equipped with one or more input/output devices, such as a human interface 715 (including speaker, microphone, mouse, touchscreen, keypad, keyboard, printer, and the like), display 710, and so on. The processing unit may include a central processing unit (CPU) 720, memory 725, a mass storage device 730, a video adapter 735, and an I/O interface 740 connected to a bus 745.

The bus 745 may be one or more of any type of several bus architectures including a memory bus or memory controller, a peripheral bus, video bus, or the like. The CPU 720 may comprise any type of electronic data processor. The memory 725 may comprise any type of system memory such as static random access memory (SRAM), dynamic random access memory (DRAM), synchronous DRAM (SDRAM), read-only memory (ROM), a combination thereof, or the like. In an embodiment, the memory 725 may include ROM for use at boot-up, and DRAM for program and data storage for use while executing programs.

The mass storage device 730 may comprise any type of storage device configured to store data, programs, and other information and to make the data, programs, and other information accessible via the bus 745. The mass storage device 730 may comprise, for example, one or more of a solid state drive, hard disk drive, a magnetic disk drive, an optical disk drive, or the like.

The video adapter 735 and the I/O interface 740 provide interfaces to couple external input and output devices to the processing unit 700. As illustrated, examples of input and output devices include the display 710 coupled to the video adapter 735 and the mouse/keyboard/printer 715 coupled to the I/O interface 740. Other devices may be coupled to the processing unit 700, and additional or fewer interface devices may be utilized. For example, a serial interface such as Universal Serial Bus (USB) (not shown) may be used to provide an interface for a printer.

The processing unit 800 also includes one or more network interfaces 750, which may comprise wired links, such as an Ethernet cable or the like, and/or wireless links to access nodes or different networks 755. The network interface 750 allows the processing unit 700 to communicate with remote units via the networks 755. For example, the network interface 750 may provide wireless communication via one or more transmitters/transmit antennas and one or more receivers/receive antennas. In an embodiment, the processing unit 700 is coupled to a local-area network or a wide-area network 755 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method of communicating in a wireless system, the method comprising:
   receiving, by a station, resource scheduling information indicating a location of a resource for transmitting a packet, an indication of a target power level, and an indication of a first bandwidth, wherein the indication of the target power level is used to indicate a target uplink receive power of the packet;
   receiving, by the station, an indication of a first transmission power level, wherein the indication of the first transmission power level is used to indicate a transmit power of a downlink transmission;
   measuring, by the station, a receive power level in accordance with the downlink transmission;
   determining a path loss, in accordance with the receive power level and at least one of the first bandwidth and the first transmission power level;
   determining, by the station, a second transmission power level, in accordance with the target power level and the path loss; and transmitting, by the station, the packet at the location of the resource and at the second transmission power level.

2. The method of claim 1, the resource scheduling information, the indication of the target power level, and the indication of the first bandwidth are received in a first frame and the indication of the first transmission power level is received in a second frame.

3. The method of claim 2, wherein the first frame is a trigger frame and the second frame is a beacon frame.

4. The method of claim 2, wherein the first frame and the second frame are received at different times.

5. The method of claim 1, wherein the resource scheduling information, the indication of the target power level, the indication of the first bandwidth and the indication of the first transmission power level are received in one frame.

6. The method of claim 1, wherein determining the path loss comprises evaluating $$PL = P_{DL\_TX\_TOTAL} + 10*\log_{10}(BW_{DL}/BW_{DL\_TOTAL}) - P_{DL\_RX},$$

where PL is the path loss, $P_{DL\_TX\_TOTAL}$ is the first transmission power level, $P_{DL\_RX}$ is the receive power level, $BW_{DL}$ is a second bandwidth used to measure the receive power level, and $BW_{DL\_TOTAL}$ is the first bandwidth.

7. The method of claim 6, wherein the resource scheduling information, the indication of the target power level, and the indication of the first bandwidth are received on the second bandwidth.

8. The method of claim 6, wherein determining the second transmission power level in accordance with the path loss comprises evaluating $$P_{UL\_TX} = \min(P_{UL\_TX\_MAX}, P_{UL\_RX\_TARGET} + PL),$$

where $P_{UL\_TX}$ is the second transmission power level, $P_{UL\_TX\_MAX}$ is a maximum value of the second transmission power level, $P_{UL\_RX\_Target}$ is the target power level, PL is the path loss, and min( ) is a minimum function which returns a minimum value of its input elements.

9. The method of claim 1, wherein determining the path loss comprises evaluating $$PL = P_{DL\_TX} - P_{DL\_RX},$$

where PL is the path loss, and $P_{DL\_TX}$ is the first transmission power level, $P_{DL\_RX}$ is the receive power level.

10. A station adapted to perform power control, the station comprising:
a receiver configured to receive resource scheduling information indicating a location of a resource for transmitting a packet, an indication of a target power level, and an indication of a first bandwidth, and to receive an indication of a first transmission power level, wherein the indication of the target power level is used to indicate a target uplink receive power of the packet, and the indication of the first transmission power level is used to indicate a transmit power of a downlink transmission;
a processor operatively coupled to the receiver, the processor configured to measure a receive power level, to determine a path loss in accordance with the receive power level and at least one of the first bandwidth and the first transmission power level, to determine a second transmission power level in accordance with the target power level and the path loss, wherein the receive power level is measured in accordance with the downlink transmission; and
a transmitter operatively coupled to the processor, the transmitter configured to transmit the packet at the location of the resource and at the second transmission power level.

11. The station of claim 10, wherein the processor is configured to evaluate $$PL = P_{DL\_TX\_TOTAL} + 10*\log_{10}(BW_{DL}/BW_{DL\_TOTAL}) - P_{DL\_RX},$$

where PL is the path loss, $P_{DL\_TX\_TOTAL}$ is the first transmission power level, $P_{DL\_RX}$ is the receive power level, $BW_{DL}$ is a second bandwidth used to measure the receive power level, and $BW_{DL\_TOTAL}$ is the first bandwidth.

12. The station of claim 11, wherein the processor is configured to evaluate $$P_{UL\_TX} = \min(P_{UL\_TX\_MAX}, P_{UL\_RX\_TARGET} + PL),$$

where $P_{UL\_TX}$ is the second transmission power level, $P_{UL\_TX\_MAX}$ is a maximum value of the second transmission power level, $P_{UL\_RX\_Target}$ is the target power level, PL is the path loss, and min( ) is a minimum function which returns a minimum value of its input elements.

13. The station of claim 10, wherein the processor is configured to evaluate $$PL = P_{DL\_TX} - P_{DL\_RX},$$

where PL is the path loss, and $P_{DL\_TX}$ is the first transmission power level, $P_{DL\_RX}$ is the receive power level.

14. The station of claim 10, wherein the resource scheduling information, the indication of the target power level, and the indication of the first bandwidth are received in a trigger frame and the indication of the first transmission power level is received in a beacon frame.

15. The station of claim 10, wherein the resource scheduling information, the indication of the target power level, the indication of the first bandwidth and the indication of the first transmission power level are received in one frame.

* * * * *